Patented Nov. 6, 1934

1,979,947

UNITED STATES PATENT OFFICE 1,979,947

RESILIENT TIRE

Carl Krauch and Martin Mueller-Cunradi, Ludwigshafen-on-the-Rhine, Germany, assignors to I. G. Farbenindustrie Aktiengesellschaft, Frankfort-on-the-Main, Germany No Drawing. Application April 3, 1930, Serial No. 441,417. In Germany October 20, 1927

4 Claims. (Cl. 154—14)

This application is a continuation-in-part of the application for Letters Patent Serial No. 303,114, filed August 30th, 1928, in which a proposal has been made for the manufacture of resilient tires by vulcanizing the plastic polymerization product of butadiene. The present invention relates to improvements in the production of resilient tires for vehicles of all sorts, such as automobiles, bicycles and aeroplanes.

We have found that tires of particularly excellent quality are obtained by employing rubber for the construction of the body of the tire and by making the treads only of the plastic polymerization product of butadiene. The polymerization products obtained with the aid of alkali metals, as for example sodium or those obtained by polymerization of butadiene in a state of aqueous emulsion, are particularly suitable for this purpose.

Both treads for solid and pneumatic tires may thus be manufactured by using processes similar to those used in the case of rubber. The process is also suitable for the production of tires containing a porous filling material.

The tire treads thus obtained have the extraordinary and important property, even at low temperatures, of maintaining their elasticity to a great extent without unfavourably changing to any extent the other properties of the tire treads. The treads thus obtained are also particularly highly resistant to attrition, and the employment of rubber for the construction of the body of the tire has the advantage that this material can be particularly easily handled and worked up.

Any of the additions usually made to the rubber in the manufacture of rubber tires may be admixed with the initial materials employed in the present case. Thus filling materials, such for example as carbon black, zinc oxide and antimony sulphide or mineral rubber may be employed. Also substances, such as plasticizers, for example, stearic acid or paraffin wax may be added in small amounts. Again vulcanizing additions, such as sulphur or substances furnishing sulphur, or allied substances, such as selenium or substances furnishing selenium may be added. Substances accelerating vulcanization may in some cases also be employed, such as organic compounds of sulphur, as for instance mercapto-benzo-thiazol. Inorganic or organic colouring agents may also be incorporated. The said additions may be introduced in a suitable combination.

The advantageous properties of the treads so obtained are also apparent if the product obtained by the polymerization of butadiene is admixed with further natural or artificial products of the nature of rubber, provided that the content of the latter substances is not too high.

The following examples will further illustrate how the said invention may be carried out in practice, but the invention is not limited thereto.

Example 1

A mixture of 100 parts of the plastic product obtainable by polymerization of butadiene with the aid of sodium, 40 parts of carbon black, 5 parts of zinc oxide, 5 parts of mineral rubber, 2 parts of wool grease, 3 parts of sulphur, 1 part of aldol-alpha-naphthylamine and 0.6 part of mercapto-benzo-thiazol is prepared by intimately mixing the said initial materials between rollers. A body of a tire prepared in the ordinary way from rubber is covered with the mixture thus prepared, and the tread is finished by vulcanizing in the usual manner.

Example 2

A mixture is prepared of 100 parts of rubber, 30 parts of carbon black, 5 parts of zinc oxide, 4 parts of pine tar oil, 2 parts of stearic acid, 3 parts of sulphur and 1 part of mercapto-benzo-thiazol. This mixture is applied to cord between rollers and sheets of cords thus prepared are then cut out in the form of strips, wherein the ribs of the cord threads run in different directions in respect of the length of the strips. The strips of the cord thus prepared are then placed one over the other around a roller in the manner usual in the manufacture of tire bodies. A mixture is further prepared of 100 parts of a plastic polymerization product of butadiene obtained by polymerization with the aid of sodium in the presence of small amounts of solvents, 70 parts of carbon black, 6 parts of stearic acid, 1 part of a preservative against ageing, 1 part of sulphur and 1 part of a vulcanizing accelerator. The said mixture is run through a profile calender, whereby a strip is prepared having the crude cross-section of a tire tread. The said tread is cut up into lengths and is applied to the layers of cord already on the roller. The bead of the tire is introduced in the ordinary manner. The tire thus prepared is then removed from the roller and after being brought into a suitable form by pumping up, is vulcanized in an iron press mould for 90 minutes at a temperature of 140° C.

What we claim is:—

1. The process of manufacturing tires which comprises building the carcass of the tire with rubber in the conventional manner, applying thereto a tread composed predominantly of a plastic polymerization product of butadiene and vulcanizing the tire so formed.

2. A tire made by the process of the preceding claim.

3. A process of manufacturing tires which comprises building the carcass of the tire with rubber in the conventional manner, applying thereto a tread composed predominantly of a mixture comprising carbon black and a plastic product obtained by polymerizing butadiene with sodium and vulcanizing the tire so formed.

4. A tire made by the process of the preceding claim.

CARL KRAUCH.
MARTIN MUELLER-CUNRADI.